United States Patent [19]

Schrader

[11] 4,090,032

[45] May 16, 1978

[54] CONTROL SYSTEM FOR AUDIO AMPLIFYING SYSTEM HAVING MULTIPLE MICROPHONES

[75] Inventor: Loren P. Schrader, Rockford, Ill.

[73] Assignee: Wm. A. Holmin Corporation, Rockford, Ill.

[21] Appl. No.: 683,309

[22] Filed: May 5, 1976

[51] Int. Cl.² .................... H04M 3/56; H04R 27/00

[52] U.S. Cl. .................... 179/1 CN; 179/1 AT

[58] Field of Search .................... 179/1 AT, 1 CN, 1 H, 179/1 HF, 1 VC

[56] References Cited

U.S. PATENT DOCUMENTS

| | | | |
|---|---|---|---|
| 3,213,372 | 10/1965 | Kurvits | 325/478 |
| 3,437,758 | 4/1969 | Clement | 179/1 CN |
| 3,496,481 | 2/1970 | Torick et al. | 330/134 |
| 3,588,360 | 6/1971 | Knox | 179/1 |
| 3,755,625 | 8/1923 | Maston | 179/1 CN |
| 3,814,856 | 6/1974 | Dugan | 179/1 AT |
| 3,818,139 | 6/1974 | Snyder | 179/1 CN |
| 3,944,736 | 3/1976 | Shephard | 179/1 CN |
| 3,979,563 | 9/1976 | Kita et al. | 179/1 HF |

OTHER PUBLICATIONS

D. Dugan, "Automatic Microphone Mixing," Convention of and Eng. Soc. at Los Angeles, May, 1975.

*Primary Examiner*—Kathleen H. Claffy
*Assistant Examiner*—E. S. Kemeny
*Attorney, Agent, or Firm*—Leydig, Voit, Osann, Mayer & Holt, Ltd.

[57] ABSTRACT

A conference-type audio amplifier system has a plurality of voice-controlled microphones which produce individual output signals. Each microphone has an analog switch for turning the microphone on or off in response to its control signal relative to a reference threshold. Features of the system include: a number of microphones may be on simultaneously, and the remaining microphones (off) have their thresholds reduced by the on microphones; all the on microphones are kept on during speaker pause; simultaneous sound to multiple microphones (such as applause) causes no turn-on of any microphones and can reset the entire system, and one or more microphones switched to manual-control cause all the microphones switched to non-manual to be off.

22 Claims, 5 Drawing Figures

Figure 2A:
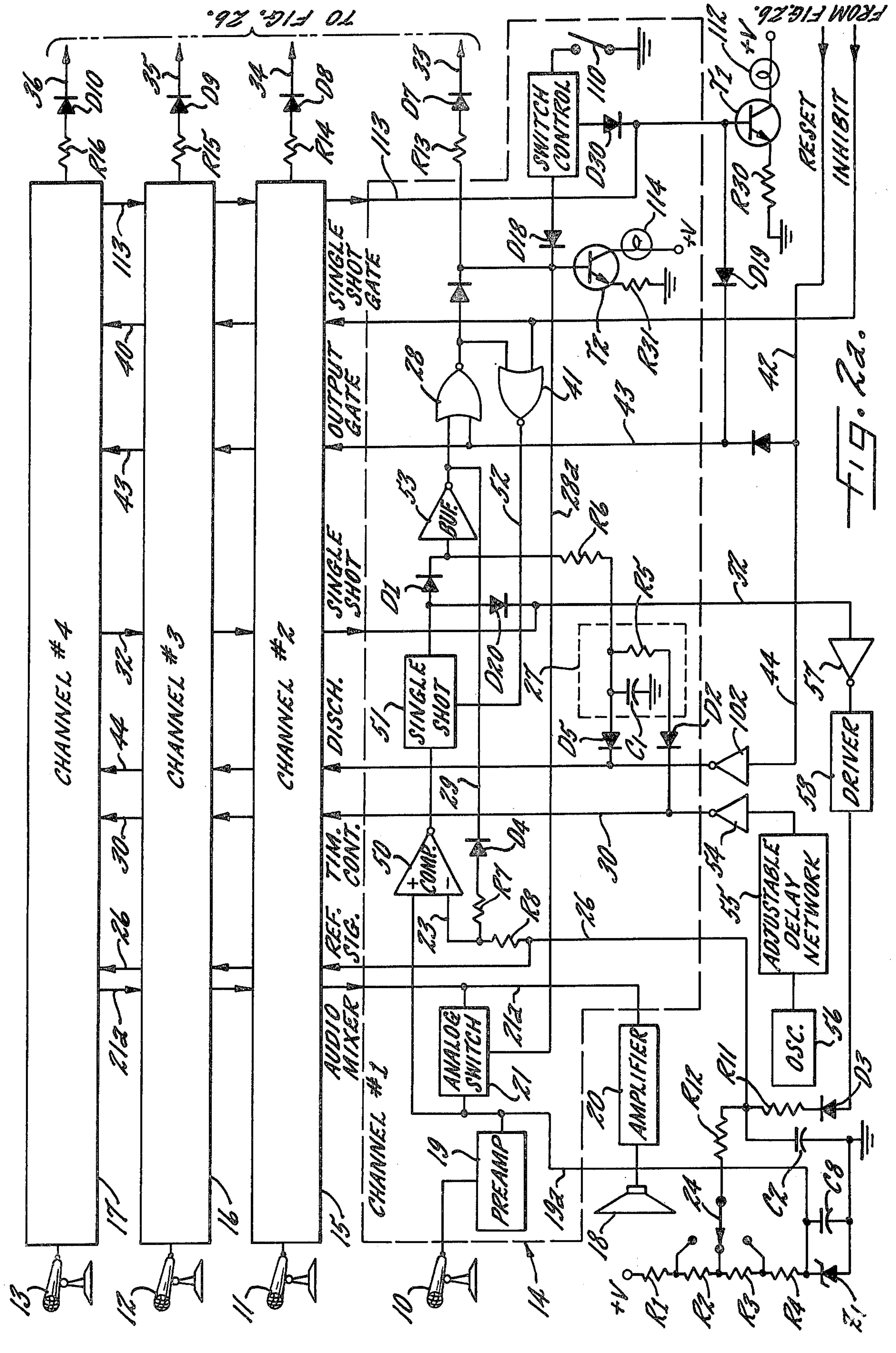

SINGLE SHOT
COMP
RESET
INHIBIT
FROM FIG. 2a.
TO FIG. 2a.
V1
V2
+V

CONTROL SYSTEM FOR AUDIO AMPLIFYING SYSTEM HAVING MULTIPLE MICROPHONES

DESCRIPTION OF THE INVENTION

This invention relates to electronic systems for controlling audio systems employing a plurality of different microphones, such as a public address or other communication system. The invention particularly relates to such systems which utilize sound actuated microphones and in which it is generally desired to have only one or a few microphones, out of the total number of microphones in the system, turned on at any given time.

In any audio amplifying or "reinforcement" system that involves multiple microphones exposed to undesirable background sounds, there is not only the problem of controlling which microphone or microphones are to be turned on at any given time, but there is also the problem of discriminating between the desirable and undesirable audio signals picked up by the multiple microphones. For example, in legislative chambers, seminar rooms and the like, there are generally a number of speakers provided with microphones that must be turned on and off, sometimes at frequent intervals, and all the microphones are exposed to a variety of undesirable background sounds originating both from the speakers themselves and from the assembled audience, such as applause, laughter, cheering and other audience reactions. Of course, there are also the normal problems of avoiding undesirable audio feedback. These problems are often solved by manually controlling which microphones are on or off at any given moment, as well as the gain, i.e., degree of amplification, of the signals from the microphones. These manual systems, however, are limited by the ability of the human operator to determine which microphones should be on or off at any given time, or by his ability to maintain the optimum gain, and by the normal reaction speed of any human operator.

Thus, systems have been developed which do not require a human operator. These systems are sound-actuated, i.e., the microphones are turned on and off according to the volume of the audio signals to which they are exposed, either in an absolute sense or relative to a particular reference signal. For example, the system described in U.S. Pat. No. 3,814,856 to D. E. Dugan turns the microphones on only when they are exposed to audio signals with a volume that exceeds the volume of a "noise" signal from a microphone that is strategically located to detect ambient background sounds in the environment in which the audio system is being used. The system described in that patent also includes a "hysteresis" feature that provides a difference in the levels of the audio signals that will actuate and deactuate the microphones. The Dugan system also automatically varies the gain of the amplification system according to the number of microphones that are on at any given time so as to avoid undesirable audio feedback from the loudspeakers to the microphones.

But even a system as sophisticated as that described in the Dugan patent is subject to serious shortcomings when used in conference-type applications where it is generally desired to have only one or two microphones, out of a much large number, turned on at any given time. For example, the background sounds that control the level of the "noise" signal can vary considerably resulting in wide fluctuations in the sensitivity of the microphones. Even after a microphone channel has been turned on, an increase in the background noise might make it difficult to keep that channel on, or a reduction in the background noise might permit all the other microphone channels to be turned on by relatively low level signals. Also, when a microphone channel is turned off by a pause in the audio input, the audio signal required to turn that channel on again may be much louder than the signal that previously turned on the channel. Moreover, increasing the gain according to the number of microphones that are on may result in undesirable audio feedback, particularly, when a relatively loud audio signal is required to turn on the microphones because of a high level of background noise and, therefore, a high threshold level.

It is a principal object of the present invention to provide an improved control system for a multiple-microphone audio amplifying system utilizing sound-actuated microphones, which automatically rejects undesirable sounds even when they are loud enough to actuate the microphones.

It is another object of this invention to provide such an audio control system which provides improved protection against undesirable audio feedback.

A further object of the invention is to provide an improved audio control system of the foregoing type which prevents normal speech characteristics, such as pauses and the like, from turning off a microphone after it has been turned on.

Still another object of the invention is to provide such an improved audio control system which may maintain a constant gain regardless of the volume of the audio signals supplied to the microphones at any given time.

A still further object of the invention is to provide such an improved audio control system which controls the threshold levels of the sound-actuated microphones independently of the background noise level.

Figure 1:
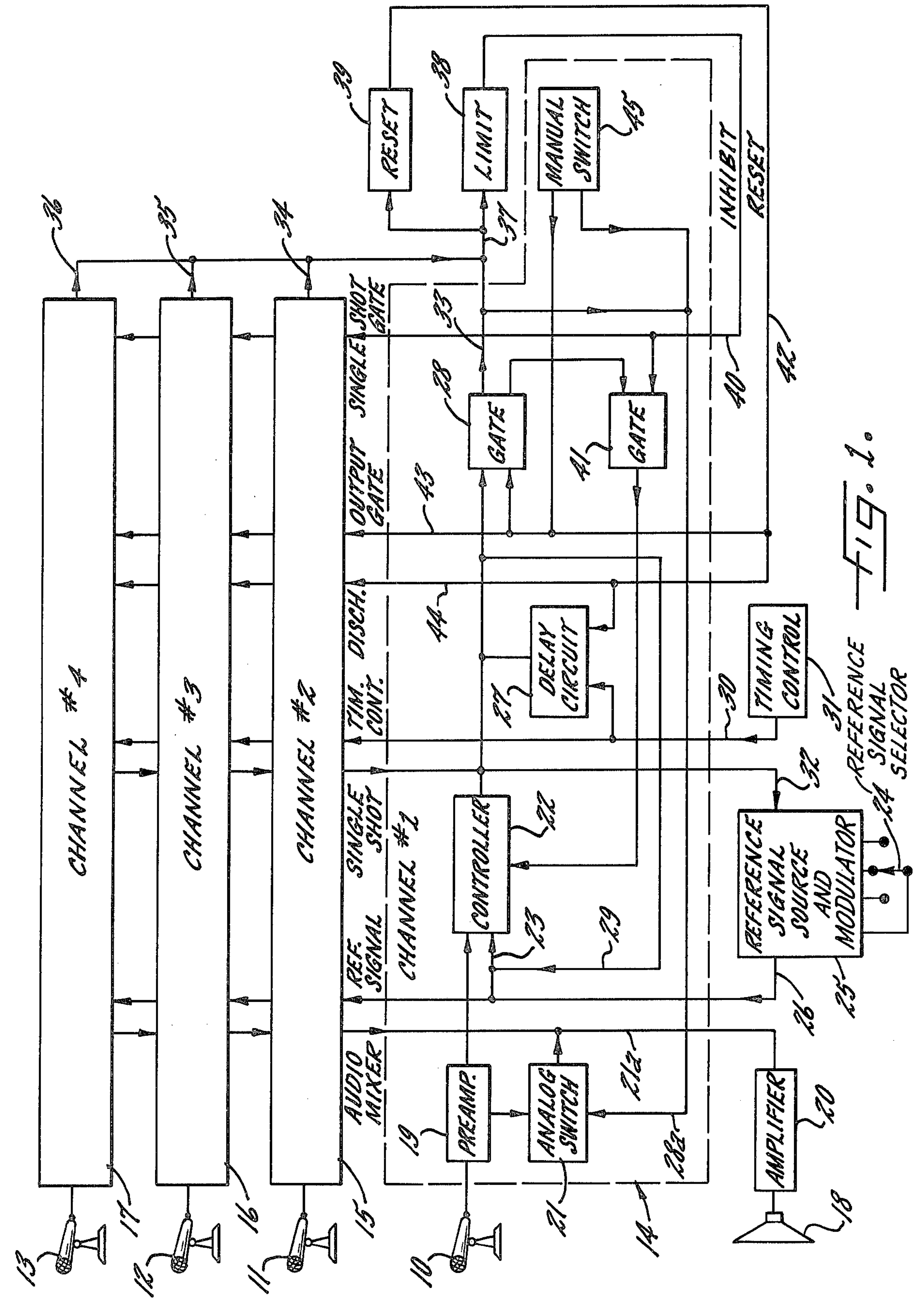

Other objects and advantages of the invention will be apparent from the following detailed description and the accompanying drawings, in which:

FIG. 1 is a block diagram of an audio control system embodying the invention;

FIGS. *2a* and *2b* taken together form a schematic diagram of one exemplary embodiment of the audio control system illustrated in FIG. 1.

Figure 3:
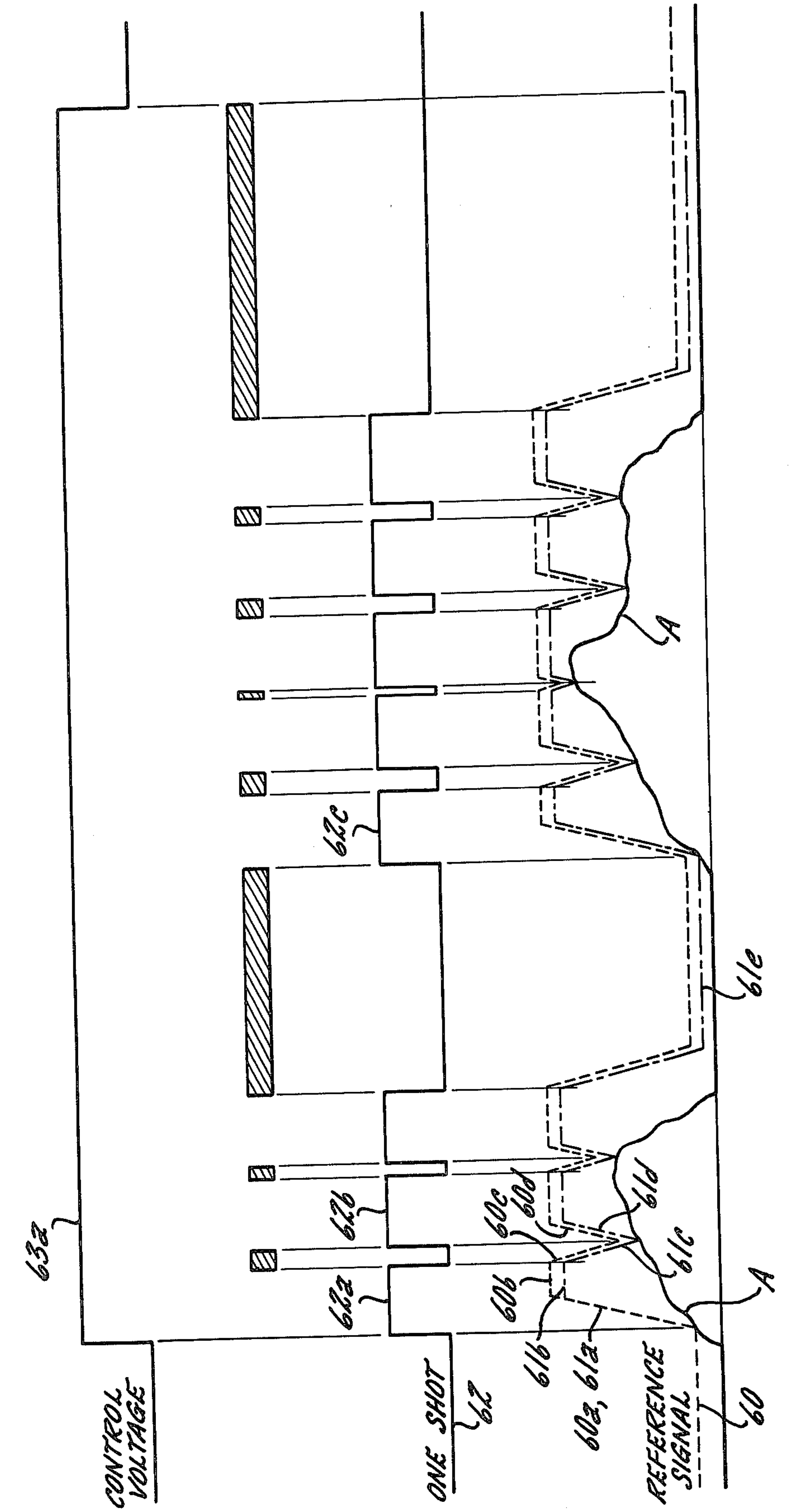
Figure 4:
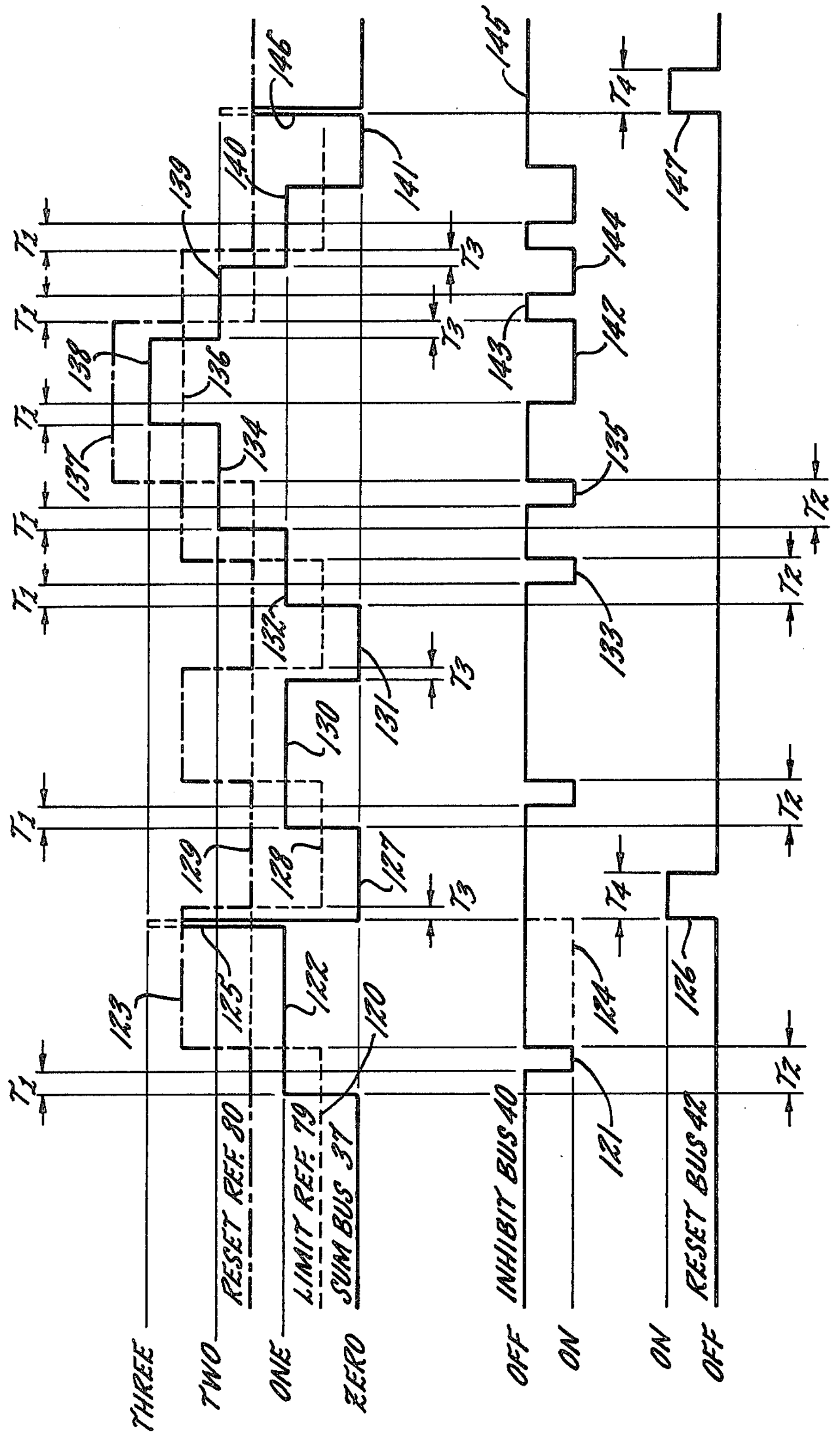

FIG. 3 is a series of waveforms produced in one portion of the system of FIGS. *2a* and *2b* and illustrating the operation thereof; and FIG. 4 is a series of waveforms produced in another portion of the system of FIGS. *2a* and *2b* and illustrating the operation thereof.

While the invention will be described in connection with certain preferred embodiments, it will be understood that it is not intended to limit the invention to these particular embodiments. On the contrary, it is intended to cover all alternatives, modifications and equivalent arrangements as may be included within the spirit and scope of the invention.

Turning now to the drawings, and referring first to FIG. 1, there is illustrated a control system for an audio amplifying system that receives input signals from four microphones 10, 11, 12 and 13. For clarity, those portions of the control system that are repeated in each microphone channel have been shown for only the one microphone 10; thus it should be understood that the entire system enclosed within the broken-line block 14 associated with the microphone 10 is repeated in each of the blocks 15, 16 and 17 associated with the other three microphones 11, 12 and 13, respectively. It should also be understood that the four-microphone system shown in the drawings is merely exemplary, and any desired number of microphones and corresponding control channels may be employed.

The principal function of the illustrative audio system is to amplify the signals from the various microphones 10–13 and to supply the amplified signals to one or more loudspeakers 18. The desired amplification is effected by a preamplifier 19 connected to the microphone 10, and similar preamplifiers connected to the other microphones 11–13, and an amplifier 20 that receives the mixed outputs from all the preamplifiers and supplies a further amplified output to the loudspeaker 18.

To permit the microphone 10 to be turned on and off according to the loudness of the audio signal received by the microphone, the output of the preamplifier 19 is supplied to both an analog switch 21 (e.g., one quarter of an MC 14016) and a controller 22. The other input to the controller 22 is a reference signal supplied via line 23, which establishes the threshold level which must be exceeded by the signal from the preamplifier 19 in order to produce an output signal from the controller 22. Whenever this threshold level is exceeded, the controller produces an output signal which enables the analog switch 21 to pass the output signal from the preamplifier 19 to a common audio mixing bus **21*a* and then on to the amplifier 20 and the loudspeaker 18, provided certain other conditions to be described below are also satisfied. When the amplitude of the envelope of the signal from the preamplifier 19 drops below the threshold level established by the reference signal on line 23, the enabling output signal from the controller 22 is terminated to disable the analog switch 21**, provided again that certain other conditions to be described below are also satisfied.

As will also be described below, the reference signal supplied to the controller 22 on the input line 23 is not always at a constant level, but may include various components which vary the threshold of the controller 22 so as to vary the sensitivity of that microphone channel, as will be described in more detail below. It will be understood that an increase in the threshold of the controller 22 represents a decrease in the sensitivity of the microphone channel because a louder audio input is required to turn on the microphone. Conversely, a decrease in the threshold level of the controller 22 represents an increase in sensitivity because the microphone will be turned on by a softer audio input.

While none of the microphones is turned on, the reference signal supplied to the controller 22 on line 23 is a constant voltage which is determined by the setting of a switch 24 associated with a reference signal source 25 which determines the voltage level applied to a reference bus line 26. The bus line 26 supplies this selected voltage level to the input line 23 of the controller 22, as well as to the corresponding inputs of the controllers in all the other microphone channels 15, 16 and 17. Consequently, the initial threshold level of all the microphone channels is selected by the setting of the switch 24, which is typically a manually operated switch so that the initial threshold level of the system can be set according to the particular environment in which the system is to be used. For example, the initial threshold level would normally be set relatively high for an environment having a relatively high background noise level, so as to prevent one or more microphones from being turned on by the background noise level alone. Conversely, for an environment having a relatively low background noise level, the switch 24 would normally be set at a correspondingly low threshold level to establish a relatively high microphone sensitivity.

Whenever, the amplitude of the envelope of the output signal from the preamplifier 19 exceeds the threshold level established by the reference signal on the input line 23, the controller 22 produces an output signal which is passed through an output gate 28 which, unless disabled, feeds the signal back to the control input of the analog switch 21 via line **28*a*. As long as this signal is present on line 28*a*, the analog switch 21 is enabled to pass the output of the preamplifier 19 to the main amplifier 20 and on to the loudspeaker 18. This is the normal response of the microphone channel to an audio signal which exceeds the preselected initial sensitivity level of the microphone 10**.

In order to increase the sensitivity of a microphone channel after it has been turned on, the output signal from the gate 28 is fed back to the input line 23 of the controller 22, thereby reducing the threshold level of the controller. More specifically, the output of the gate 28 is fed back through a line 29 to the controller input line 23, where the signal on line 29 is arithmetically summed with the reference signal on the bus line 25. After the microphone 10 has been turned on, this feedback signal to the reference input 23 increases the sensitivity of this one microphone to allow the audio input to the microphone to decrease somewhat from its original actuating level without turning the microphone off. For example, a speaker might initially turn the microphone on by speaking directly into the microphone, and then subsequently move farther away from the microphone as he continues to speak.

In accordance with one aspect of the present invention, a delay means is responsive to termination of the output signal from the controller for enabling the corresponding analog switch for a predetermined time interval after the corresponding microphone output signal drops below the threshold level required to keep the microphone turned on. This delay feature keeps the microphone turned on during relatively short pauses in the audio input to the microphone, such as the pauses encountered in normal speech. Thus, in the illustrative system, the output of the controller 22 is supplied to a delay circuit 27 which maintains an enabling signal at the control input of the analog switch 21 for a predetermined time interval following termination of an enabling output signal from the controller 22. This predetermined delay in the disabling of the analog switch 21 following the termination of each enabling output signal from the controller 22 keeps the microphone 10 turned on for a predetermined time interval each time the output from the microphone 10 and the preamplifier 19 drops below the threshold level of the controller 22.

In accordance with a further aspect of the invention, adjusting means are provided for changing the delay interval introduced by the delay circuit 27 so as to adjust the predetermined time interval within which the analog switch remains enabled to keep the corresponding microphone turned on. Thus, in the illustrative system, the delay interval is controlled by a signal supplied to a timing bus line 30 from an adjustable timing control 31. This adjustable timing feature permits the system to be tailored to different types of desired audio inputs, depending on the normal lengths of pauses encountered in such audio inputs.

As another important feature of the invention, the reference signal on the bus line 26 is modulated in accordance with the amplitude of the microphone output signals, thereby automatically varying the threshold levels of the comparators to avoid the enabling of the various analog switches in response to undesirable audio signals, particularly the output of the loudspeaker. Thus, in the illustrative system, the controller 22 generates a series of pulses that are applied to the reference signal source 25 via line 32. Each time a pulse appears on the line 32, the voltage level on the reference signal bus line 26 increases, thereby increasing the threshold level of the controller 22 to reduce the sensitivity of the microphone 10. In the intervals between successive pulses, the level of the reference signal on bus line 25 drops until it reaches the level of the other input to the controller 22 from the preamplifier 19, at which point the controller 22 again produces an output pulse. Thus, it can be seen that the threshold level of the controller 22 as determined by the reference signal input is continually modulated to seek the level of the other controller input signal, which is the envelope of the audio output signal from the preamplifier 19.

Since the termination of each pulse from the controller 22 is always determined by the time required for the reference signal to drop to the then-existing amplitude of the envelope of the signal from the preamplifier 19, the time intervals between successive pairs of pulses generated by the controller 22 vary in direct proportion to the varying amplitude of the envelope signal from the preamplifier 19. The higher the amplitude of this envelope signal, the shorter the time required for the reference signal to reach the level of the envelope signal, and thus the shorter the time interval between successive pulses from the controller 22. Thus, it can be seen that the controller 22 produces pulses at intervals that decrease with increasing amplitude of the envelope of the audio signal, and these decreasing intervals result in smaller drops in the reference signal and, therefore, in the threshold of the controller 22. Conversely, the intervals between successive pulses from the controller 22 increase with decreasing amplitudes of the envelope of the audio signal, resulting in larger drops in the reference signal and the threshold level of the controller 22. Unless the amplitude of the audio signal drops to the original unmodulated level of the reference signal, the reference signal source 25 continuously modulates the reference signal at a variable level above its original level. Moreover, the modulation of this increased reference signal follow the amplitude variations in the audio signal, which is the same signal that causes acoustic feedback from the loudspeaker. Because the electronic circuit reacts faster than the loudspeaker sound can reach a microphone, the sensitivity of the microphone is always reduced in time to avoid an unwanted response to the loudspeaker sound. In this connection, it will be appreciated that the acoustic path always provides a delay that is longer than the response time of the threshold modulating circuitry.

It should be noted that the modulated reference signal on the bus line 26 is applied to all microphone channels. On the other hand, the feedback signal on line 29 is applied only to the controller 22 of the single microphone 10. Consequently, the microphone that is turned on will always have a greater sensitivity than those microphones which are turned off and which are receiving only the reference signal present on the bus line 26.

It should also be noted that the signal from the delay circuit 27 which delays the disabling of the analog switch 21 in the absence of an output signal from the controller 22 is longer than the maximum time interval between successive output pulses from the controller as long as the audio signal remains above the minimum level of the reference signal. Consequently, after a microphone has been turned on, it is impossible for the modulation of the reference signal to turn that microphone off unless the amplitude of the audio input signal remains below the minimum level of the reference signal at the controller input 23 for a period longer than the delay interval established by the delay circuit 27.

Before the first pulse is generated by the controller 22, the reference signal on the bus line 26 is at a minimum to maximize the sensitivity of all the microphones in the system when all microphones are off so that any microphone can respond to an audio signal while the signal is just beginning and its amplitude is relatively low. This ensures that the beginning of a word or sound is not missed. After a microphone is turned on, however, the sensitivity of all the microphones is immediately reduced (i.e., the thresholds of all the controllers 22 are increased) to prevent the microphones from picking up the output of the loudspeaker or any other undesirable sounds. At the end of each pulse generated by the controller 22, the thresholds of all the controllers are reduced until the threshold of the controller for the on microphone reaches the amplitude of the audio signal at that particular point in time. During this discharge interval, the microphone that was previously turned on is kept on by the signal generated by the delay circuit 27.

When more than one microphone is turned on at the same time, the pulses generated by the controllers in all those channels are received by the bus line 32. Of course, a signal will normally be received on the bus line 32 from only one channel at any given instant, and so the modulation of the reference signal will normally be controlled by only the active microphone channel at any given time. If signals happen to be momentarily received from two or more channels at the same time, the modulation will be controlled by the stronger of the two signals, i.e., by the channel receiving the audio input with the greatest amplitude. An off microphone will not turn on unless its controller receives an audio input signal with an amplitude greater than the reference signal which controls the controller of the microphone that has been previously turned on. Thus, the reference signals supplied to the comparators of both the on and off microphones are modulated in the same manner, but at slightly different levels. In both cases the microphone sensitivity tracks the peaks of the audio input signal to the on microphone so that the sensitivity is maintained at the minimum level required to transmit the desired audio input signal while rejecting the maximum amount of unwanted sound.

The modulated reference signal provided by this invention is one of the features that permits the gain of the amplifying system to remain constant throughout its operation. That is, it is not necessary to reduce the gain of the system during operation in order to prevent undesired feedback response or microphone turn-on due to the audio output of the loudspeaker.

While permitting more than one microphone to be turned on at the same time, the system of this invention also limits the maximum number of microphones that can be on at any given time. This ability to permit the activation of more than one microphone channel, within a selected limit, is important in certain applications. For instance, in a question-and-answer session, a one-channel limit would cause a delay between the turning off of one channel and the turning of another channel because of the delay circuit 27 provided to allow for pauses in the audio input to each individual channel. However, if two or more microphones are turned on at the same time, the audio inputs to both microphones are continuously transmitted. But by limiting the maximum number of microphones that can be on at any given time, audio feedback can be avoided without reducing gain, and the chances of picking up undesirable sounds, due to an excessive number of microphones being on at the same time, are also minimized.

In the illustrative system of FIG. 1, the number of microphone channels that are turned on at any given time is detected by monitoring signals produced on output lines 33, 34, 35 and 36 from the respective microphone channels 14, 15, 16 and 17. These signals are produced only when the respective microphone channels are turned on because because they are the same signals that are used to enable the analog switches 21 via the control lines 28*a*.

Thus, a signal is produced on the output line 33 from channel 14 each time the controller 22 receives a signal from the preamplifier 19 which is greater than the reference signal received on input line 23. Similarly, the controllers in each of the other microphone channels 15, 16 and 17 produce signals on the respective output lines 34, 35 and 36 whenever they receive signals from their respective preamplifiers which are greater than their respective reference signals, and all these signals from lines 33–36 are combined in a single "sum" bus line 37. The resulting "sum" signal is applied to a limit unit 38 and a reset unit 39. The limit unit 38 is used to detect a selected limit, i.e., the maximum number of channels that are to be permitted to be activated at any given time in the system, and the reset unit 39 is used to detect when the system should be reset.

Since the signal on the sum line 37 is the sum of the output signals from all the microphone channels, the magnitude of this sum signal is directly proportional to the number of microphones turned on at any given time. When the level of this sum signal reaches the level of the selected "limit", the limit unit 38 produces an output signal on an "inhibit" line 40 connected to a gate 41 in each of the microphone channels. In each channel where the microphone was turned on before the selected limit was reached, the gate 41 is disabled by the output signal from the gate 28 and, therefore, does not respond to the "inhibit" signal on line 40. However, in those channels where the microphone was initially off before the selected limit was exceeded, the inhibit signal generated on line 40 changes the output of the gate 41 to disable the controller 22. Thus, once the selected limit has been reached, the inhibit signal prevents the turning on of any additional microphones by disabling the controllers 22 in all the remaining microphone channels. This inhibit signal continues as long as the maximum number of microphones remain on so that the first microphones to be turned on retain priority over all the other microphones until one of the on microphones is turned off by a sustained reduction in its audio input signal.

When it is desired to permit either two or three microphones to be on at the same time, the limit unit 38 is set to produce an inhibit signal on line 40 when the signal on the sum line 37 indicates that two or three microphones, respectively, have been turned on. For example, if the limit unit 38 is set to permit two microphone channels to be turned on at the same time, then when the signal on the sum line 37 in fact increases to a level which indicates that two microphones have been turned on, this signal triggers the limit unit 38 to produce an inhibit signal on the bus line 40 to disable all the microphone channels except the two channels that have already been turned on.

When the limit unit 38 is set to permit three microphones to turn on at the same time, the limit unit 38 is triggered by a signal on the sum line 37 indicating that three or more microphones are turned on, producing an inhibit signal on the bus line 40 to disable all the microphone channels except the three channels that have already been turned on.

In accordance with still another aspect of the present invention, the simultaneous initiation of enabling signals in two or more microphone channels resets the entire system, including all the analog switches 21, to prevent the transmission of the audio signal that caused the simultaneous response by the multiple channels. Such a simultaneous response by two or more channels is normally caused by an undesirable audio input, such as loud applause or similar audience reaction or by disturbance of a table containing several microphones. This is particularly true in applications where the principal sounds to be amplified are voices, because the probability of two persons starting their speech at the same instant is extremely small.

This reset operation is initiated by the reset unit 39. To permit the reset unit 39 to detect whether the signals on the sum line 37 which trigger the production of inhibit signals by the limit unit 38 are the result of simultaneous outputs from more than one microphone gate, each inhibit signal generated by the limit unit 38 is delayed for a predetermined time interval, e.g., 0.1 second. During this delay interval, the reset unit 39 is triggered if the signal on the sum line 37 indicates that two or more microphones have been turned on simultaneously. For example, if the system is set for a limit of one microphone, the reset unit 39 responds to a signal on the sum line 37 indicating that two or more microphones are on. If the system is set for a limit of two or three, the reset unit 39 responds to a signal on the sum line 37 indicating that three or four microphones (two more than the next lower limit)are on. In any of these situations, the triggering of the reset unit 39 produces a reset pulse on a reset bus 42 to reset the entire system, as will be described in more detail below.

Within this delay of the inhibit signal on line 40, which in effect defines the interval within which multiple signals must be received on the sum line 37 in order to be considered "simultaneous", all the microphone channels are permitted to respond to simultaneous audio input signals to produce a signal on the sum line 37 which is immediately detected by the reset unit 39 as an undesirable signal. The reset unit responds to this condition by producing an output pulse which is applied to the inhibit bus line 40 to serve the same function as the normal inhibit signal described previously.

In addition, the reset pulse is applied to the "reset" bus line 42 which in turn applies the pulse to an "output gate" bus line 43 and a "discharge" bus line 44. The pulse on the output gate bus line 43 immediately disables the output gates 28 in all microphone channels so that no further enabling signals can be supplied to the analog switches 21, thereby interrupting all output signals to the amplifier 20 and the loudspeaker 18 from the entire system. This interruption persists for the duration of the output pulse from the reset unit 39, which allows time for the undesirable audio signal to dissipate. To ensure that the disabling of the analog switch in response to the reset signal does not produce an audible event, the analog switch 21 includes a conventional RC time delay which slows the switch response very slightly; this slight delay, combined with the extremely rapid turn-on speed of the reset cycle, prevents any audible output at the loudspeaker 18.

Because the signals supplied to the sum line 37 are derived from the outputs of the gates 28, the disabling of these gates also removes the signal from the sum line 37 so that the reset unit 39 no longer detects an undesirable condition. Consequently, the output signal from the reset unit 39 is terminated, thereby terminating the reset cycle.

This entire reset operation occurs very rapidly and does not provide adequate time for the time delay signals from the delay circuits 27 to terminate. Of course, the termination of these signals is necessary to prevent the delay circuits 27 from turning on those microphone channels which were previously on only because of the undesirable audio input which produced the simultaneous signals detected by the reset unit 39. Accordingly, the delay circuits 27 in any microphone channels that are on reset by the reset pulse applied to the discharge bus 44.

When the reset cycle is terminated, those microphones which are still receiving desirable audio inputs will immediately be turned on again. The interruption of the audio output effected by the brief reset cycle is usually not noticeable, particularly in view of the fact that the brief interruption is normally masked by the undesirable audio signal which initiated the reset cycle in the first place.

To permit one or more of the microphones to be operated manually rather than in response to the audio inputs to the individual microphones, a manually operated switch 45 produces an output signal on the control line 28*a* which enables the analog switch 21 in the same manner as a pulse generated by the controller 22. In accordance with a further specific aspect of the invention, the manually operated switch for each microphone channel may also be connected to the output gate bus 43 for rendering inoperative all the other microphone channels whenever one or more of the analog switches 21 are enabled by a manually operated switch 45. Thus, in the illustrative system of FIG. 1, the output of the manual switch 45 is connected to the output gate bus 43 so that whenever the switch turns on the microphone 10, it also prevents the gates 28 in all the other microphone channels from passing any output signals from their respective microphones. This feature of the invention permits the manually operated switches 45 to override the audio-operated control of the analog switches 21 in those channels that are not turned on manually.

It should also be noted that an enabling output from the manually operated switch 45 also produces an output signal on the output line 33 in the same manner as the audio-operated control system. Thus, as long as a microphone is turned on, an output signal appears on the line 33 regardless of whether the microphone is being controlled by its audio input or by the manual switch 45. Consequently, the limit and reset units 38 and 39 respond to the turning on of a microphone in exactly the same manner regardless of whether the microphone has been turned on by its audio input or by a manual input.

Figure 2B:
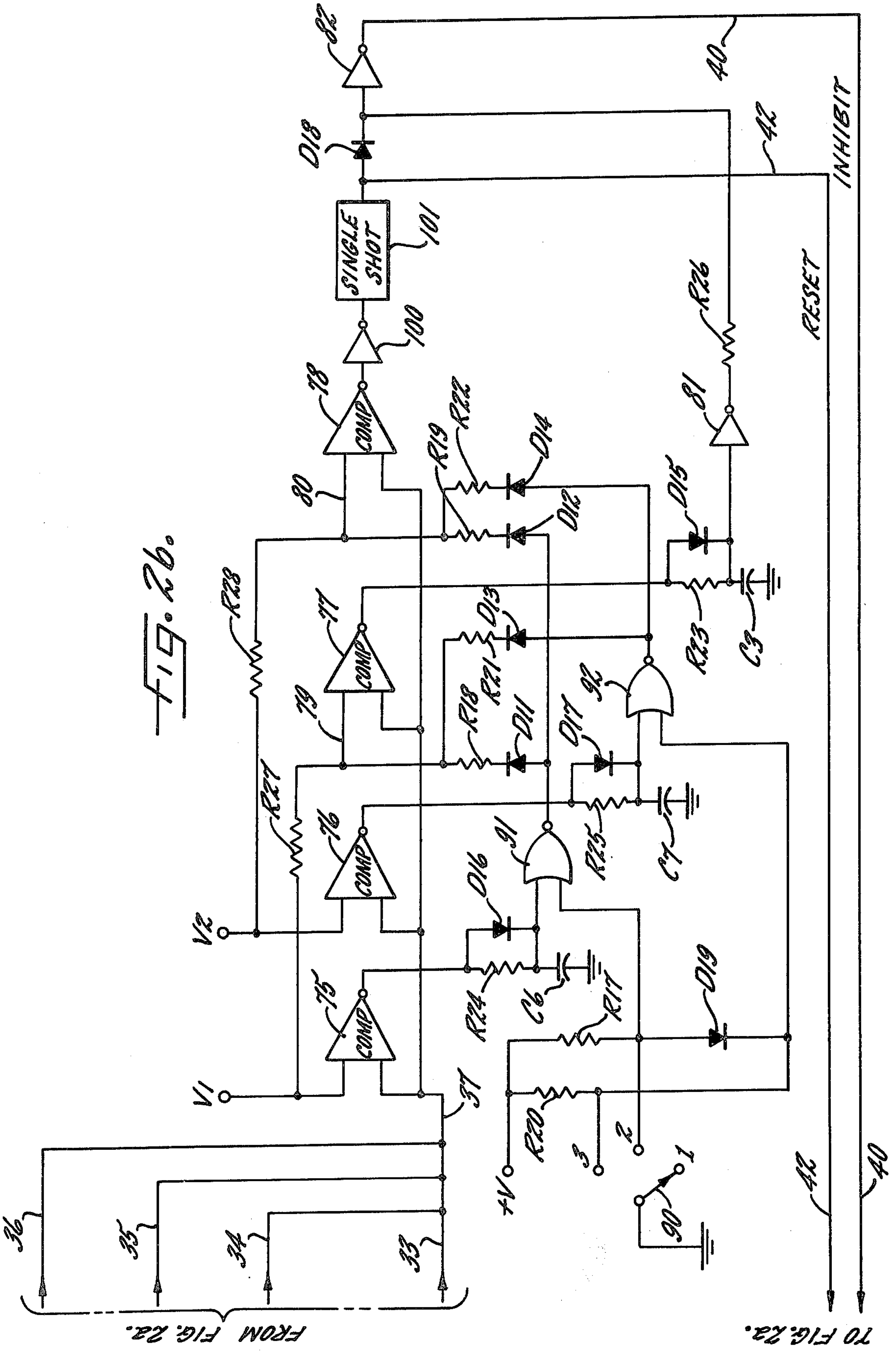

In FIGS. 2*a* and 2*b*, there is shown a more detailed schematic diagram of a system embodying the features described above in connection with the more general block diagram of FIG. 1. To simplify correlation of the two diagrams, common elements therein have been assigned common reference numbers. Thus, as in the case of FIG. 1, the system of FIGS. 2*a* and 2*b* includes four microphones 10, 11, 12 and 13 for supplying audio input signals to four control channels 14, 15, 16 and 17, respectively. The audio output signals from these four channels are all supplied to a common bus line 21*a* for application to an amplifier 20 and loudspeaker 18.

The controller 22 in each microphone channel includes a comparator 50 which receives the output of the preamplifier 19. The other input to the comparator 50 is a reference signal supplied via line 23, which establishes the threshold level which must be exceeded by the signal from the preamplifier 19 in order to produce an output signal from the comparator 50. Whenever this threshold level is exceeded, the comparator produces an output signal which enables the analog switch 21 to pass the output signal from the preamplifier 19 to a common audio mixing bus 21*a* and then on to the amplifier 20 and the loudspeaker 18, provided the other necessary conditions are also satisified. When the amplitude of the envelope of the signal from the preamplifier 19 drops below the threshold level established by the reference signal on line 23, the enabling output signal from the comparator 22 is terminated to disable the analog switch 21, provided again that certain other conditions to be described below are also satisfied.

When none of the microphones is turned on, the reference signal supplied to the comparator 50 on line 23 is a constant voltage which is determined by the setting of the switch 24 adapted to connect the reference signal bus line 26 to a selected one of three points on a voltage divider formed by resistors R1, R2, R3 and R4 connected in series between a voltage source V and ground. Thus, the setting of the switch 24 determines which of the multiple voltage levels available at the various points along the voltage divider is applied to the reference bus line 26. The bus line 26 supplies this selected voltage level to the input line 23 of the comparator 50, as well as to the corresponding inputs of the comparators in all the other microphone channels. Consequently, the initial threshold level of all the microphone channels is selected by the setting of the switch 24, as already described above in connection with FIG. 1.

The initial threshold level of the comparator 50 is also determined by a positive bias signal added to the output signal from the preamplifier 19 before it is applied to the comparator 50 to prevent the application of excessively negative signals to the comparator 50 and/or the analog switch 21. This bias signal is supplied by a line 19*a* connected to the output line of the preamplifier 19 from a point between the resistor R4 and a zener diode Z1. A capacitor C8 is connected in parallel with the zener diode Z1 for filtering and decoupling purposes.

Whenever the amplitude of the envelope of the output signal from the preamplifier 19 exceeds the threshold level established by the reference signal on the input line 23, the comparator 50 produces an output signal which triggers a single shot multivibrator 51. The output signal from the comparator 50 consists of short pulses produced by repetitive triggering of the comparator by the complex audio signal received from the preamplifier 19. The corresponding output pulses generated by the multivibrator 51 have a constant pulse width and provide a more well-defined signal than the output of the comparator 50 so as to produce more precise and reliable response of the various control elements to which the signal is supplied. It should be noted that the singal shot multivibrator 51 always resets after producing an output pulse of constant width determined by the internal RC timing components of the multivibrator, i.e., it does not maintain a constant output signal as long as it receives triggering signals at its input. Thus, if triggering signals are continually supplied to the multivibrator 51, it produces a train of successive pulses of constant width rather than a constant output signal at a given voltage level. In addition, the multivibrator 51 can be disabled by the application of a signal to a control input via line 52; this input overrides any input that the multivibrator 51 receives from the comparator 50 so that the multivibrator remains turned off, or turns off at once, whenever a disabling signal is present on line 52. The application of this disabling signal to the vultivibrator 51 is controlled by the NOR gate 41 which will be described in more detailed below.

An output pulse from the single shot multivibrator 51 indicates that the threshold level of the comparator 50 has been exceeded by the output signal from the preamplifier 19. This output pulse is passed through a buffer 53 and then on through the output NOR gate 28 which, unless disabled, feeds the signal back to the control input of the analog switch 21 via line 28*a*. As long as this signal is present on line 28*a*, the analog switch 21 is enabled to pass the output of the preamplifer 19 to the main amplifier 20 and on to the loudspeaker 18. This is the normal response of the microphone channel to an audio signal which exceeds the preselected initial sensitivity level of the microphone 10.

To increase the sensitivity of a microphone channel after it has been turned on, the output signal from the single shot multivibrator 51 is fed back to the input line 23 of the comparator 50, thereby reducing the threshold level of the comparator. More specifically, the output of the multivibrator 26 is passed through the buffer 53 and then fed back through the line 29 to the comparator input line 23, where the signal on line 29 is arithmetically summed with the reference signal on the bus line 26. A diode D4 in the feedback line 29 prevents the output of the buffer 53 from being applied to the reference input 23 of the comparator when the microphone 10 is off. After the microphone 10 has been turned on, the diode D4 conducts a feedback signal to the reference input 23, thereby reducing the sensitivity of the microphone to allow the audio input to the microphone to decrease somewhat from its original actuating level without turning the microphone off. For example, a speaker might initially turn the microphone on by speaking directly into the microphone, and then subsequently move farther away from the microphone as he continues to speak. The feedback through line 29 also ensures hard turn on of the comparator 50 and helps to avoid any oscillation that might occur when the comparator is barely triggered by a relatively weak signal from the preamplifier 19. The extent to which the feedback signal on line 29 reduces the reference signal on the input 23 is dependent on the ratio of two resistors R7 and R8 in the feedback line 29 and the bus line 26, respectively.

The delay means in the system of FIGS. 2*a* and 2*b* is responsive to termination of the output signal from the single shot multivibrator 51 for enabling the corresponding analog switch 21 for a predetermined time interval after the corresponding microphone output signal drops below the threshold level required to keep the microphone turned on. As described previously, this delay feature keeps the microphone turned on during relatively short pauses in the audio input to the microphone, such as the pauses encountered in normal speech. Thus, in the illustrative system, the output of the single shot multivibrator 51 is supplied through a coupling diode D1 to time dealy circuit 27 comprising a resistor R5 and a capacitor C1. The coupling diode D1 prevents discharge of the capacitor C1 when the multivibrator 51 resets. A resistor R6 is connected in series with the timing capacitor C1 to prevent the capacitor from shorting the pulses from the multivibrator 51 to a ground when the capacitor is in the discharged state. Without this series resistor R6, the timing capacitor C1 could introduce an objectionable delay in the turn-on of the microphone 10, because the capacitor C1 would deprive the buffer 53 and the analog switch 21 of a turn-on pulse during the initial portion of the charging cycle of the capacitor C1.

During each pulse generated by the single shot multivibrator 51, the timing capacitor C1 is charged through the series resistor R6 before the multivibrator 51 resets and ends the pulse. Then during the ensuing reset interval, i.e., before the multivibrator 51 generates another pulse, the charge on the capacitor C1 is applied back through the series resistor R6 to the input of the buffer 53. This signal is passed on through the gate 28 to line 28*a* so as to maintain an enabling signal at the control input of the analog switch 21 for a predetermined time interval determined by the discharge rate of the timing circuit 27. The buffer 53 has an extremely high input impedance, so there is essentially no voltage drop across the series resistor R6, i.e., essentially the entire voltage on the capacitor C1 is applied to the buffer 53. Consequently, the analog switch 21 remains enabled until the charge on the capacitor C1 drops below the enabling level. The net result is a predetermined delay in the disabling of the analog switch 21 following the termination of each output pulse from the single shot multivibrator, thereby keeping the microphone 10 turned on for a predetermined time interval each time the output from the microphone 10 and the preamplifier 19 drops below the threshold level of the comparator 22.

The length of the delay effected by the timing circuit 27 is determined by the rate at which the capacitor C1 discharges. Because of the high impedance of the buffer 53 and the reverse-biased coupling diode D1, the charge on the timing capacitor C1 bleeds off only through leakage and at a relatively slow rate. The principal discharge path for the capacitor C1 is through the resistor R5 and a blocking diode D2 to a buffer 54 in the "timing" bus line 30.

The timing control 31 in the illustrated system of FIGS. 2*a* and 2*b* comprises a capacitor C1 whose rate of discharge is controlled by a signal supplied to the timing bus line 30 from an adjustable delay network 55. This delay network 55 receives a train of pulses from an oscillator 56 and, in effect, divides the frequency of the oscillator output. The output of the network 55 is applied to the buffer 54, and it is the output of this buffer 54 that is applied to the timing bus line 30 and thence to all the microphone channels in order to control the discharge times of all the corresponding timing capacitors therein.

More specifically, when the output of the buffer 54 is at its high level, the blocking diode D2 is reversed biased so that the timing capacitor C1 cannot discharge through the resistor R5. On the other hand, when the output of the buffer 54 is at its low level, the capacitor C1 can discharge through the resistor R5 and the diode D2. Consequently, the discharge time of the capacitor C1 can be varied by controlling the ratio of the time that the output of the buffer 54 is high to the time that the output of the buffer 54 is low. For example, if the buffer output is switched back and forth between its high and low levels at a high frequency, and is at the low level for 50% of the duty cycle during which the capacitor C1 is discharging, then the capacitor discharges through the resistor R5 during only half of the total discharge time. As a result, the capacitor discharge time is approximately double the time that would be required if the capacitor were allowed to discharge continuously at its normal rate through the resistor R5. By adjusting the delay network 55 to vary the frequency of the pulses that are supplied to the buffer 54, the time required for the capacitor C1 to discharge can be varied over a relatively wide range. As mentioned previously, this adjustable timing feature permits the system to be tailored to different types of desired audio inputs, depending on the normal lengths of pauses encountered in such audio inputs.

It will be appreciated that the adjustable delay network 55 may be a conventional counter which counts the pulses generated by the oscillator 56 and generates an output pulse in response to the counting of every *n*th pulse from the oscillator. The counter may be controlled to vary *n*, thereby varying the time required for the capacitor C1 to discharge by varying the rate at which pulses are applied to the timing bus line 30.

As will be described in more detail below, the capacitor C1 can also be discharged by connecting it directly to ground through a blocking diode D5 and the "discharge" bus line 44. This dumps any charge on the capacitor C1 directly to ground in order to reset the timing circuit 27.

For the purpose of modulating the reference signal on the bus line 26 in accordance with the amplitude of the microphone output signals, the pulses generated by the single shot multivibrator 51 are applied to the "single shot" bus line 32 through a diode D20 and fed through a buffer 57 and a driver 58 to an RC network comprising a resistor R11 and a capacitor C2. This bus line 32 receives output pulses not only from the multivibrator 51, but also from the corresponding multivibrators in all the other microphone channels. The buffer 57 prevents the modulating circuit from loading the output line from the single shot multivibrator 51, while the driver 58 satisfies the current requirements of the modulating circuit.

In the absence of a pulse on the single shot bus line 32, the output of the driver 58 is at ground level so that no current flows through the resistor R11 or a blocking diode D3 in series therewith. However, as soon as a pulse appears on the bus line 32, the output of the driver 58 is increased to its high level, e.g., 10 volts, so that current flows through the diode D3 and the resistor R11. The resistor R11 limits the current so that the desired voltage drop occurs across a resistor R12 in series with the selector switch 24. This increases the voltage level on the reference signal bus line 26, thereby increasing the threshold level of the comparator 50 to reduce the sensitivity of the microphone 10.

The rate at which the voltage on the reference signal bus line 26 is increased in response to an output signal from the drive 58 is determined by the timing capacitor C2 connected between the bus line 26 and ground. However, the charge rate for this capacitor is such that it always becomes fully charged within the time interval defined by a single pulse from the multivibrator 51, or from any of the corresponding multivibrators in the other microphone channels. The particular channel that initiated the pulse remains turned on in spite of the increasing level of the reference signal due to its delay circuit. Then when the pulse terminates, the capacitor C2 immediately starts to discharge at approximately the same rate at which it charged.

As the capacitor C2 discharges, it reduces the level of the reference signal on the bus line 26, thereby reducing the threshold level of the comparator 50. This reduction in the level of the reference signal continues until it drops below the level of the other comparator input signal from the preamplifier 19, at which the point the comparator 50 again produces an output signal which enables the single shot multivibrator 51 to generate another pulse. This recharges the capacitor C2 until the end of the pulse, when the capacitor discharges again until it reaches the then-existing level of the audio signal from the preamplifier 19. Thus, it can be seen that the threshold level of the comparator 50 as determined by the reference signal input is continually modulated to seek the level of the other comparator input signal, which is the envelope of the audio output signal from the preamplifier 19. Since the discharge time of the capacitor C2 following the termination of each pulse from the multivibrator 51 is always determined by the time required for the reference signal to drop to the then-existing amplitude of the envelope of the signal from the preamplifier 19, the time intervals between successive pairs of pulses generated by the multivibrator 51 vary in direct proportion to the varying amplitude of the envelope signal from the preamplifier 19.

When more than one microphone is turned on at the same time, the pulses generated by the single shot multivibrators in all those channels are received by the buffer 57 and the driver 58. Of course, a signal will normally be received by the buffer 57 from only one channel at any given instant, and so the modulation of the reference signal will normally be controlled by only the active microphone channel at any given time. If signals happen to be momentarily received from two or more channels at the same time, the modulation will be controlled by the stronger of the two signals, i.e., by the channel receiving the audio input with the greatest amplitude.

The effect of the threshold modulation can be more clearly understood by reference to the exemplary waveforms shown in FIG. 3. The levels of the waveforms at the extreme lefthand and righthand sides of FIG. 3 illustrate the condition of the circuitry in the absence of an audio signal A from the preamplifier 19. The dash-dash broken line waveform 60 represents the signal on the reference signal bus 26, the dash-dot broken line waveform 61 represents the signal at the reference input 23 to the single shot multivibrator 51, the solid line waveform 62 represents the output of the multivibrator 51, and the solid line waveform 63 represents the signal on the control input line 28*a* to the analog switch 21. When the audio signal A increases to the initial level of the reference signal 60, the comparator 50 produces an output signal which triggers the single shot multivibrator 51 to generate a pulse 62*a*. This pulse is passed through the buffer 53 and the output gate 28 and fed back to the control input of the analog switch 21 to increase the level of the control voltage 63 on line 28*a* to the high level 63*a*, which enables the switch 21 to pass the audio signal to the amplifier 20 and loudspeaker 18. The pulse 62*a* generated by the multivibrator 51 is also fed through the buffer 57 and the driver 58 to initiate the charging of the capacitor C2, thereby causing the reference signals 60 and 61 to increase as indicated at 60*a* and 61*a* until the capacitor C2 is fully charged. When the capacitor C2 is fully charged, the reference signals level off as indicated at 60*b* and 61*b*. when the pulse 62*a* terminates, the capacitor C2 immediately begins to discharge, thereby reducing the reference signals as indicated at 60*c* and 61*c*. The capacitor C2 continues to discharge until the reference signal 61 is reduced to the level of the audio input signal A at that particular time.

It should be noted that the reference signal 61 presented to the reference input 23 of the comparator 50 is not exactly the same as the reference signal 60 on the bus line 26. It will be recalled that a feedback signal is supplied from the buffer 53 via line 29 to the reference input 23 where it is arithmetically summed with the signal from the bus line 26. The effect of this feedback signal on line 29 is to reduce the reference signal somewhat below the level that appears on the bus line 26, so that the threshold of the comparator 50 for a microphone that is turned on is always slightly below the threshold levels of the corresponding comparators for the microphones that are turned off. It can be seen that this signal 61 follows the profile of signal 60, but the magnitude of the signal 61 is always less than that of the signal 60 by a constant differential.

Thus, in the case of a microphone that has been turned on, the discharge of the capacitor C2 continues until the level of the signal 61 is reduced to the amplitude of the audio signal A at that particular time. At this point, the audio input to the comparator 50 is again at the threshold level of the comparator, and so the comparator again produces an output which triggers the signal shot multivibrator 51 to generate a second pulse 62*b*. This pulse causes the capacitor C2 to be recharged, as indicated at 60*d* and 61*d*, until the pulse 62*b* terminates. At this point the capacitor C2 again discharges until the reference signal 61 is reduced to the amplitude of the audio signal A at that particular time. This cyclic operation continues as long as the amplitude of the audio signal A remains above the minimum level of the signal 61, which is indicated at 61*e*. If the audio signal A drops below the minimum reference signal level 61*e*, no further pulses are produced by the single shot multivibrator 51, but the analog switch 21 remains enabled by the control voltage 63*a* which is maintained by the timing circuit 27 for a predetermined time interval. If the audio signal A returns above the level of the minimum reference signal 61*e* during this predetermined time interval, the comparator 50 will again respond to trigger the single shot multivibrator 51 and generate another pulse, as illustrated by the pulse 62*c* in FIG. 3. The cyclic operation of the modulating circuit will then again continue until the audio signal again drops below the minimum reference signal 61*e*.

When the audio signal A remains below the minimum reference signal level 61*e* for a time interval longer than the predetermine time interval established by the timing circuit 27, the control voltage 63 supplied to the control input of the analog switch 21 returns to its low level, as indicated at 63*b* in FIG. 3, to turn off the microphone 10. At the same time, the feedback signal on line 29 is terminated so that the reference signal supplied to the reference input 23 of the comparator 50 increases from level 64*a* to the original level 60 of the initial reference signal on the bus line 26.

The shaded areas between the signals 62 and 63 in FIG. 3 indicate the time intervals between the pulses in the signal 62 generated by the single shot multivibrator 51. These shaded areas clearly illustrate that the time intervals between successive pulses vary in direct proportion to the amplitude of the audio signal A. Before the first pulse is generated by the multivibrator 51, the reference signal 60 is at a minimum to maximize the sensitivity of all the microphones in the system when all microphones are off, so that any microphone can respond to an audio signal while the signal is just beginning and its amplitude is relatively low. This ensures that the beginning of a word or sound is not missed. After a microphone is turned on, however, the sensitivity of all the microphones is immediately reduced (i.e., the thresholds of all the comparators 50 are increased) to prevent the microphones from picking up the output of the loudspeaker or any other undesirable sounds. At the end of each pulse generated by the single shot multivibrator 51, the thresholds of all the comparators are reduced until the threshold of the comparator for the one microphone reaches the amplitude of the audio signal at that particular point in time. During this discharge interval, the microphone that was previously turned on is kept on by the signal generated by the time delay circuit 27.

When the system is set to permit more than one microphone to be turned on at the same time, an off microphone will not turn on unless its comparator receives an audio input signal with the an amplitude greater than that of the reference signal 60, rather than the reference signal 61 which controls the comparator of the microphone that has been previously turned on. Thus, the reference signals supplied to the comparators of both the on and off microphones are modulated in the same manner, but at slightly different levels. In both cases, the microphone sensitivity tracks the peaks of the audio input signal to the on microphone so that the sensitivity is maintained at the minimum level required to transmit the desired audio input signal while rejecting the maximum amount of unwanted sound.

In the illustrative system of FIGS. 2*a* and 2*b*, as in the system in FIG. 1, the number of microphone channels that are turned on at any given time is detected by monitoring signals produced on output lines 33, 34, 35 and 36 from the respective microphone channels 14, 15, 16 and 17. Thus, signals are produced on the output lines 33–36 each time the respective comparators 50 receive signals from the preamplifiers 19 which are greater than the reference signals received on input lines 23. More specifically, the output of the gate 28 in each microphone channel is connected to one of the output lines 33–36 through a series resistor R13, R14, R15, or R16 which sets the amount of current that any one channel can supply to the sum line 37 and a diode D7, D8, D9 or D10 which prevents the voltage on the sum line 37 from being applied to the control line of any channel other than the channel or channels from which the voltage originated. All these output signals on lines 33–36 are combined in the single sum bus line 37, and the resulting sum signal is applied as one of the inputs to each of four comparators 75, 76, 77 and 78.

The first two comparators 75 and 76 are used to detect when one channel or two channels, respectively, have been activated. The third comparator 77 is used to detect a selected limit, i.e., the maximum number of channels that are to be permitted to be activated at any given time in the system, and the fourth comparator 78 is used to detect when the system should be reset. The initial references signal supplied from source V1 to the comparator 75 and to comparators 77 via resistor R27, represents the signal level that must be exceeded on the sum line 37 to indicate that one microphone has been turned on, and the initial reference signal supplied from source V2 to the comparator 76, and to comparator 78 via resistor R28, from source V2 represents the signal level that must be exceeded on the sum line 37 to indicate that two microphones have been turned on. That is, the limit comparator 77 is initially set for a limit of one, and the reset comparator is initially set to detect when two microphones are turned on. The illustrative system is designed to permit the selection on only 1, 2 or 3 channels as a limit, but it will be apparent that the system can be easily modified to accommodate higher limits if desired.

The limit comparator 77 always receives a signal on its reference input line 79 which represents the selected limit. Since the signal on the sum line 37 is the sum of the output signals from all the microphone channels, the magnitude of this sum signal is directly proportional to the number of microphones turned on at any given time. When the level of this sum signal exceeds the level of the selected "limit" input signal to the limit comparator 77, the comparator produces an output signal which is fed through a pair of buffers 81 and 82 to the inhibit line 40 connected to the NOR gate 41 in each of the microphone channels (a diode D18 prevents the inhibit signal from being applied to the reset bus 42). In each channel where the microphone was turned on before the selected limit was exceeded, the NOR gate 41 is disabled by the output signal from the gate 28, and therefore, does not respond to the inhibit signal on line 40. However, in those channels where the microphone was turned off before the selected limit was exceeded, the inhibit signal generated on line 40 changes the output of the gate 41 to disable the single shot multivibrator 51. Thus, once the selected limit has been reached, the inhibit signal prevents the turning on of any additional microphones by disabling the single shot multivibrators 51 in all the remaining microphone channels.

When it is desired to permit two or three microphones to be turned on at the same time, a switch 90 is set to either a "two channel" or "three channel" position, as indicated in FIG. 2*b*. When the switch 90 is set at the "two channel" position, it produces a voltage drop across a resistor R17 to supply an input signal to a NOR gate 91, thereby enabling the output signal from the two-channel comparator 75 to increase the level of the reference signals applied to the input 79 of the limit comparator 77 and to the input 80 of the reset comparator 81. This comparator 75 has one input connected to the reference signal source VI which represents the threshold level that must be exceeded by the signal on the sum line 37 to indicate that one microphone has been turned on. When this threshold level is exceeded by the signal on the sum line 37, which is continuously monitored by the comparator 75, the comparator 75 produces an output signal which is transmitted through the enabled gate 91 and applied to the reference input 79 of the limit comparator 77 via diode D11 and resistor R18, and to the reference input 80 of the reset comparator 78 vis diode D12 and resistor R19.

As will be appreciated from the foregoing description, even when the limit selector switch 90 has been set to permit more than one microphone to be turned on at the same time, the reference signals to the limit comparator 77 and the reset comparator 78 are not increased until after the signal on the sum line 37 indicates that at least one microphone has already been turned on. This permits both the limit comparator 77 and the reset comparator 78 to react to the signal on the sum line before the reference signals to these two comparators are changed. As explained previously, the initial reference signals supplied to these two comparators 77 and 78 are different from the outset; the initial reference signal supplied to the limit comparator 77 is set to trigger the comparator when the signal on the sum line 37 indicates that one or more microphones have been turned on, while the initial reference signal to the reset comparator 78 is set to trigger the comparator when the signal on the sum line 37 indicates that two or more microphones have been turned on.

Thus, when only one microphone has been turned on, the only comparators that are triggered by the signal on the sum line 37 are the two-channel comparator 75 and the limit comparator 77. If a limit of one has been selected, the output of the two-channel gate 91 is inoperative, but the output of the limit comparator 77 produces an inhibit signal which is applied to the bus line 40. This inhibit signal disables all the microphone channels except the one channel that has already been turned on, and thus it is impossible for the signal on the sum line 37 to thereafter increase.

If the limit selector switch 90 is set to permit two microphone channels to be on at the same time, then the output produced by the triggering of the two-channel comparator 75 (in response to the signal produced on the sum line 37 when the first microphone is turned on) changes the level of the output of the gate 91 to increase the reference signal to both the limit comparator 77 and the reset comparator 78. These latter two comparators are then biased so that the limit comparator 77 is triggered by a signal on the sum line 37 indicating that two or more microphones are turned on, and the reset comparator 78 is triggered by a signal on the sum line 37 indicating that three or more microphones have been turned on. Of course, the increase in the bias on the limit comparator 77 also removes any inhibit signal that was previously produced by this comparator on the inhibit bus 40 to permit a second microphone to turn on. Then when the signal on the sum line 37 in fact increases to a level which indicates that two microphones have been turned on, this signal triggers both the three-channel comparator 76 and the limit comparator 77. Because the limit selector switch 90 has been set for a two-channel limit, the resulting output of the three-channel gate 92 is inoperative, since the limit has already been reached. However, the output of the limit comparator 77 produces an inhibit signal on the bus line 40 to disable all the microphone channels except the two channels that have already been turned on.

When the limit selector switch 90 is set at the "three channel" position to permit three microphones to turn on at the same time, it produces a voltage drop across both the resistor R17 and a resistor R20 to supply input signals to both the NOR gate 91 and a NOR gate 92 (a diode D19 prevents grounding of the input to gate 92 when the switch is in this position). This enables the output signals from the two-channel comparator 75 and the three-channel comparator 76 to increase the levels of the reference signals applied to the inputs 79 and 80 of the comparators 77 and 78, respectively. The three-channel comparator 76 has its reference input connected to the reference signal source V2 which represents the threshold level that must be exceeded by the signal on the sum line 37 to indicate that two microphones have been turned on. When this threshold level is exceeded by the signal on the sum line 37, which is continuously monitored by the comparator 76, the comparator 76 produces an output signal which is transmitted through the enabled gate and applied to the reference input 79 of the limit comparator 77 via diode D17 and resistor R21, and to the reference input 80 of the reset comparator 78 via diode D14 and resistor R22.

Of course, the increase in the bias on the limit comparator 77 also removes any inhibit signal that was previously produced by this comparator on the inhibit bus 40 to permit a third microphone to turn on. Then when the signal on the sum line in fact increases to a level indicating that three microphones have been turned on, this signal triggers the limit comparator 77 to produce an inhibit signal on the bus line 40 to disable all the microphone channels except the three channels that have already been turned on.

As mentioned previously, this invention includes a reset feature which responds to the simultaneous initiation of enabling signals in two or more microphone channels to reset the entire system, including all the analog switches 21, to prevent the transmission of the audio signal that cause the simultaneous response by the multiple channels. This reset operation is initiated in the system of FIGS. 2*a* and 2*b* by the reset comparator 78. To permit the reset comparator 78 to detect whether the signals on the sum line 37 which trigger the production of inhibit signals by comparator 77 are the result of simultaneous outputs from more than one microphone gate, each inhibit signal generated by the limit comparator 77 is delayed for a predetermined time interval, e.g., 0.1 second. During this delay interval, the reset comparator 78 is triggered if the signal on the sum line 37 indicates that two or more microphones have been turned on simultaneously. The triggering of the reset comparator 78 then produces an output signal which is passed through an inverter 100 to trigger a single shot multivibrator 101, which in turn produces a reset pulse on both the inhibit bus 40 and the reset bus 42 to reset the entire system, as will be described in more detail below. A resistor R26 prevents the reset signal from being grounded through the buffer 81.

The delay in the transmission of the inhibit signals produced by the limit comparator 77 is effected by an RC circuit comprising a resistor R23 and a capacitor C3 connected to the output of the comparator. More specifically, in the absence of an output signal from the limit comparator 77, the output of the comparator 77 is at a relatively high voltage level, and the capacitor C3 is charged through a diode D15. Then when an output signal is subsequently produced by the limit comparator 77, the output of the comparator 77 goes low, and the capacitor C3 discharges through the resistor R23. It is only after the capacitor is discharged that the voltage level on the bus line 40 drops to the requisite level to represent an "inhibit" signal.

Within this delay interval determined by the discharge time of the capacitor C3, which in effect defines the interval within which multiple signals must be received on the sum line 37 in order to be considered "simultaneous", all the microphone channels are permitted to respond to simultaneous audio input signals to produce a signal on the sum line 37 which is immediately detected by the reset comparator 78 as an undesirable signal. The reset comparator 78 responds to this condition by immediately producing an output signal which is passed through the inverter 100 to the single shot multivibrator 101 to produce an output pulse which is applied to the inhibit bus line 40 to serve the same function as the normal inhibit signal described previously.

As described previously, the reset pulse generated by the single shot multivibrator 101 is also applied to the "reset" bus line 42 which in turn applies the pulse to an "output gate" bus line 43 and a "discharge" bus line 44. The pulse on the output gate bus line 43 immediately disables the output gates 28 in all microphone channels so that no further enabling signals can be supplied to the analog switches 21, thereby interrupting all output signals to the amplifier 20 and the loudspeaker 18 from the entire system. This interruption persists for the duration of the output pulse from the single shot multivibrator 101, which allows time for the undesirable audio signal to dissipate. Because the signals supplied to the sum line 37 are derived from the outputs of the gates 28, the disabling of these gates also removes the signal from the sum line 37 so that the reset comparator 78 no longer detects an undesirable condition, thereby terminating the reset cycle.

This entire reset operation occurs very rapidly and does not provide adequate time for the time delay capacitors C1 in the active microphone channels to be completely discharged. Of course, the discharge of these capacitors C1 is necessary to prevent the capacitors from turning on those microphone channels which were previously on only because of the undesirable audio input which produced the simultaneous signals detected by the reset comparator 78. Accordingly, the capacitors C1 in all the microphone channels are discharged by the reset pulse applied to the discharge bus 44, through a buffer 102. Because of the inverting function of the buffer 102, this signal actually removes the previously existing voltage level from the bus 44 to permit the capacitors C1 in any of the microphone channels that were previously turned on to quickly discharge through the corresponding diodes D5, as described previously. Complete discharge of the capacitors C1 is ensured by the width of the reset pulse generated by the single shot multivibrator 101. Thus, even if the output signal from the reset comparator 78 is terminated before the capacitors C1 are discharged, the width of the reset pulse from the single shot multivibrator 101 ensures complete discharge of the capacitors C1. Therefore, it can be seen that the time delay introduced by the single shot multivibrator 101 is twofold: it allows time for the undesirable signal which initiated the reset cycle to be dissipated, and it allows time for the capacitors C1 to be completely discharged. Nevertheless, the duration of the reset cycle is still extremely short.

To provide further protection against undesirable "noise" signals, the outputs of the two-channel and the three-channel comparators 75 and 76 are delayed in their transmission to the limit and reset comparators 77 and 78 by a predetermined time interval that is slightly longer than the time interval by which the inhibit signal produced by the limit comparator 77 is delayed. This causes the limit comparator to produce a brief inhibit signal just prior to each of the staged increases in the limit established by the reference signal supplied to the limit comparator 77 until it reaches the maximum limit set by the selector switch 90. Consequently, there is a short "deadband" just prior to each stage of the limit increase, during which the inhibit signal produced by the limit comparator 77 disables all the microphones that have not yet been turned on. Furthermore, the delay in the outputs of the comparators 75 and 76 also ensures that the reset comparator 78 has time to respond to a signal representing simultaneous turn-on of two or more microphones, before the reference signal supplied to the reset comparator 78 is increased. In the illustrative system of FIG. 2*b*, the delay in the transmission of the output signals from the comparators 75 and 76 is effected by RC circuits comprising a resistor R24 and a capacitor C6 connected to the output of the comparator 75, and a resistor R25 and a capacitor C7 connected to the output of the comparator 76. In the absence of output signals from these comparators 75 and 76, the outputs thereof are at relatively high voltage levels, and the capacitors C6 and C7 are charged through diodes D16 and D17, respectively. Then when an output signal is subsequently produced by one or both of the comparators 75 and 76, the output of that comparator or comparators goes low, and the corresponding capacitor C6, or both capacitors C6 and C7, discharge through the respective resistors R24 and R25. It is only after the capacitor or capacitors are discharged that the reference signals to the comparators 77 and 78 are increased.

The operation of the limit and reset portions of the illustrative system can be more clearly understood by reference to the exemplary waveforms shown in FIG. 4. The levels of the waveforms at the extreme left hand and right hand sides of FIG. 4 illustrate the condition of the system when all the microphones are turned off. When the first microphone is turned on, the signal on the sum bus 37 rises from the zero level to the one-microphone level, as illustrated by the uppermost solid line waveform in FIG. 4. This increase in the sum signal is detected by both the one-channel comparator 75 and the limit comparator 77, both of which receive an initial reference signal at a level between the zero and one-microphone levels of the sum signal, as indicated at 120. After a time delay T1, the limit comparator 77 generates an inhibit signal 121 on the bus 40. Assuming that the limit selector switch 90 has been set for a limit of two or more, the inhibit signal 121 prevails only until the output of the comparator 75 increases the reference signal supplied to the limit comparator 77. This increase in the reference signal to the limit comparator 77 occurs after a time delay T2, at which point the reference signal to the limit comparator 77 rises to a level between the one-microphone and two-microphone levels of the sum signal, as illustrated at 122 in FIG. 4. At the same time, the reference signal to the reset comparator 78 is increased from its initial level between the one-microphone and two-microphone levels of the sum signal, as illustrated at 123.

It can been seen that the net result of the operation as described thus far is to increase the reference signals to both the limit comparator 77 and the reset comparator 78 by one stage to permit a second microphone to be turned on, after a brief deadband interval defined by the pulse 121 on the inhibit bus 40. If the limit selector switch 90 were set for a one-microphone limit, the inhibit signal 121 would remain on the bus line 40 until the first active microphone was turned off, and the reference signals to the limit and reset comparators 77 and 78 would remain at their original levels. However, when the limit is set to permit two or more microphones to be turned on, the inhibit signal is removed from the bus line after the brief deadband interval defined by the differential between the time intervals T2 and T1.

The next event illustrated by the exemplary waveforms in FIG. 4 is the occurrence of an undesired audio signal which turns on two additional microphones simultaneously, thereby increasing the signal on the sum line 37 as illustrated at 125 in FIG. 4. This increase in the sum signal is detected by all four comparators 75 through 78. However, because there is no delay circuit in the output of the reset comparator 78, the reset comparator initiates a reset pulse 126 on the bus line 42 before any of the outputs from the other comparators 75 through 77 become effective. This reset pulse 126 immediately resets the system as described above, thereby returning the sum signal on the bus line 37 to its zero level, as illustrated at 127 in FIG. 4. After a short time delay T3, the reference signals supplied to the limit and reset comparators 77 and 78 also return to their original levels, as illustrated at 128 and 129, respectively. This time delay T3 is considerably shorter than the time delay T2 required to increase the reference signals to the limit and reset comparators, because the timing resistors R24 and R25 are bypassed by the respective diodes D16 and D17 to permit the corresponding capacitors C6 and C7 to charge very quickly.

It can be seen that the reset condition is maintained for a time interval T4 defined by the width of the pulse 126. As mentioned above, this time interval allows time for the undesirable signal which initiated the reset signal to dissipate, and permits the capacitors C1 in the microphone channels that were turned on to be completely discharged.

After the reset cycle has been terminate, i.e. after termination of the time interval T4 defined by the reset pulse 126, the subsequent turning on of a microphone again increases the signal on the sum line 37 from the zero level to the one-microphone level, as illustrated at 130. The microphone that is turned on following a reset cycle will normally be the same microphone that was turn on prior to the appearance of the undesirable audio input that initiated the reset cycle. In any event, the increase in the sum signal produced by the next microphone to turn on generates another inhibit pulse on the bus line 40 and increases the reference signals to the limit and reset comparators 77 and 78 in the same manner described previously, and as illustrated in FIG. 4. This condition then prevails until another reset cycle, or until the microphone is turned off so as to return the sum signal to its zero level, as illustrated at 131 in FIG. 4.

The next sequence of events illustrated in FIG. 4 is the turning on of three different microphones, but at intervals greater than the time delay T2 so that the resulting increases in the sum signal are not detected as simultaneous signals by the reset comparator. Thus, when the first microphone turns on, the sum signal increases to the one-microphone level as illustrated at 132 in FIg. 4. This produces a brief inhibit pulse 133 and increases the reference signals applied to both the reset and the limit comparators 77 and 78 in the same manner described previously. When the second microphone is turned on, while the first microphone is still on, the sum signal on the bus line 37 increases to the two-microphone level as illustrated at 134. This again produces a brief inhibit pulse 135 on the bus line 40, and increases the reference signals to the limit and reset comparators 77 and 78 one more stage. Thus, the reference signal to the limit comparator 77 is raised to a level between the two-microphone and three-microphone levels of the sum signal, as illustrated at 136, and the reference signal to the reset comparator 78 is increased to a level above the three-microphone level of the sum signal, as illustrated at 137. The system then permits a third microphone to turn on, which increases the sum signal to the three-microphone level as illustrated at 138. This assumes, of course, that the limit selector switch 90 has been set at the three-channel position to permit the reference signals to the limit and reset comparators 77 and 78 to be increased to the levels illustrated in FIG. 4.

It will be apparent from the description thus far that even when the selector switch 90 is set to permit two or three microphones to be on at the same time, the selected number of microphones will be permitted to turn on only in stages, as illustrated by the waveforms in FIG. 4. If two or more microphones ever turn on simultaneously, i.e., at any time within a delay interval shorter than T1, the resulting signal on the sum bus line 37 will trigger the reset comparator 78 to initiate a reset cycle. Nor are the multiple microphones permitted to turn on within the balance of the time interval T2, because the inhibit pulse 121, 133 and 135 onthe inhibit bus 40 prevent any additional microphones from turning on during the deadband interval represented by the difference between the delay intervals T2 and T1.

As the microphones are turned off, the sum signal on the bus line 37 is reduced in stages from the three-microphone level 138 to the twomicrophone level 139, then to the one-microphone level 140, and finally to the zero level 141. It should be noted that as long as the sum signal remains at the maximum three-microphone level 138, the inhibit signal produced by the comparator 77 is maintained on the bus line 40, as illustrated at 142, so that no additional microphones can be turned on after the limit has been reached. As the microphones are turned off, the reduction in the reference signals to the limit and reset comparators 77 and 78 lags the reduction in the sum signal by the delay interval T3. Consequently, each time a microphone is turned off, the inhibit signal produced by the comparator 77 on the bus line 40 is interrupted for the delay interval T1 following each delay interval T3, as illustrated at 143 in FIG. 4. The inhibit signal is then resumed again, as illustrated at 144, until the next microphone is turned off.

When the last microphone is turned off, the sum signal drops to it zero level as illustrated at 141, and the inhibit signal is removed from the bus 40, as illustrated at 145. If two or more microphones are turned on simultaneously anytime, as illustrated by the increase 146 in the sum signal for example, the reset comparator 78 is again triggered to produce a reset pulse 147 which initiates another reset cycle in the same manner described previously. Thus, it can be seen that whenever two or more microphones are turned on simultaneously, i.e., within the time interval T1 defined by the delay network on the output limit comparator 77, the reset comparator 78 responds by producing a reset pulse before any of the outputs from other comparators 75 through 77 become effective.

To permit one or more of the microphones to be operated manually rather than in response to the audio inputs to the individual microphones, a manually operated switch 110 is connected to a switch control 111 for generating an enabling signal on the control line 21*a* leading to the control input of the analog switch 21. When the switch 110 is momentarily closed, it triggers the switch control 111 to produced an ouput signal which enables the analog switch 21, in the same manner as a pulse generated by a single shot multivibrator 51. When the switch 110 is momentarily closed again, it triggers the switch control 111 to remove the enabling signal from the line 28*a*. The switch control 111 may take several different forms, one of which is a D-type flip-flop which has it clock input connected to the switch 110, its non-inverting (Q) output connected to the line 28*a*, and its inverting ($\bar{Q}$) output connected to the data input of the flip-flop. A D-type flip-flop connected in this manner will provide alternate high and low (or zero) voltage levels at its Q output in response to successive momentary closings of the switch 110. Thus, when the switch 110 is closed the first time, the microphone channel is locked on until the switch 110 is closed again, at which time the flip-flop toggles and the microphone channel is turned off. A coupling diode D18 connected between the switch control 111 and the analog switch 21 prevents the switch control 111 from shorting the audio-operated control system when the manual switch 110 is open and the output of the switch control 111 is at its low level.

To disable the audio-operated control means in all the microphone channels whenever any analog switch 21 is enabled by the manually operated switch 110, the switch control 111 generates an output which is connected through diodes D30 and D19 to the output gate bus 43. Then whenever the switch control 111 produces an enabling signal on line 28*a*, it also produces a signal on the bus line 43 which disables the gates 28 in all microphone channels to prevent them from being turned on by their audio inputs. The diode D19 prevents a reset signal on the bus line 43 from illuminating the lamp 112 which will be described below.

To provide a visible indication whenever any microphone has been turned on by a manual switch, the same output from the switch control 111 that is applied to the output gate bus 43 also energizes an indicator lamp 112 by turning on a transistor T1. More specifically, the output of the switch control 111 supplied to the diode D30 is connected to the base of the transistor T1 which has its collector and emitter connected respectively to the lamp 112 and a resistor R30. Thus, whenever the switch control 111 produces an enabling output, it renders the transistor T1 conductive to allow current to flow from a source V through the lamp 112 to provide the desired visible indication that the analog switch 21 is under the control of the manual switch. The resistor R26 connected in series with the lamp 112 limits the current flow therethrough.

The transistor T1 is similarly controlled by enabling output signals from the switch controls 111 in all the other microphone channels via bus line 113. Thus, the lamp 112 is illuminated whenever any of the microphones is turned on by its manual switch 110. A diode D30 prevents a signal on the bus line 113 from another channel from being grounded through the switch control 111.

Another lamp circuit is provided within each microphone channel to indicate when each individual channel is turned on. Thus, the control line 28*a* is connected to the base of a transistor T2 to illuminate a lamp 114 whenever the analog switch 21 is enabled, whether it be from an audio input or a manual input. Current is supplied to the lamp 114 from a source V, and is limited by a resistor R31.

It should also be noted that an enabling output from the manually operated switch control 111 also produces an output signal on the output line 33, in the same manner as the audio-operated control system. Thus, as long as a microphone is turned on, an output signal appears on the line 33 regardless of whether the microphone is being controlled by its audio input or by the manual switch 110. Consequently, the limit and reset circuitry responds to the turning on of a microphone in exactly the same manner regardless of whether the microphone has been turned on by its audio input or by a manual input.

I claim as my invention:

1. A control system for an audio amplifying system having a plurality of microphones producing individual output signals, said control system comprising the combination of (a) a plurality of switching means each of which is connected to one of said microphones for turning the respective microphones on and off, (b) a plurality of control means each of which is connected to one of said microphones and is responsive to the individual output signal from one of said microphones for enabling the corresponding switching means to turn that microphone on in response to a microphone output signal above a predetermined threshold level, (c) means for supplying a reference signal to each of said control means for establishing the threshold level at which said control means enables the corresponding switching means, (d) and modulating means connected to said control means and responsive to the output signals from said control means connected to the microphones that are turned on for modulating said reference signal in accordance with the amplitude of the output signals of the microphones that are turned on, thereby automatically varying the threshold levels of said control means to avoid the enabling of said switching means in response to undesirable audio signals.

2. An audio control system as set forth in claim 1 wherein said modulating means modulates said reference signal in direct proportion to the amplitudes of the envelopes of the output signals of the microphones that are turned on so that the thresholds of said control means are raised in direct proportion to the amplitudes of said envelopes, thereby varying the sensitivities of the microphones in inverse proportion to the amplitudes of said envelopes.

3. An audio control system as set forth in claim 1 wherein said modulating means includes a monostable multivibrator for producing constant width pulses at intervals which vary in accordance with the amplitude of the envelope of the microphone output signal, signal generating means responsive to each of said pulses for generating a modulating signal that increases during the presence of each pulse and decreases in the variable intervals between successive pulses, said modulating signal being applied to said reference signal to vary the magnitude of said reference signal in accordance with the variations in the intervals between said pulses.

4. An audio control system as set forth in claim 3 wherein said monostable multivibrator produces pulses at intervals that increase with decreasing amplitude of the envelope of the microphone output signal whereby the magnitude of said modulating signal decreases with decreasing amplitudes of said envelope and increases with increasing amplitudes of said envelope.

5. An audio control system as set forth in claim 4 wherein said monostable multivibrator is triggered to produce a constant width pulse by the output signal from said control means, and said modulating signal decreases the threshold of said control means to the amplitude of the envelope of the microphone output signal in the intervals between successive pulses from said multivibrator, whereby said multivibrator is triggered to initiate an increase in said modulating signal each time the threshold of said control means decreases to the amplitude of said envelope so that said threshold is never reduced below the amplitude of said envelope.

6. An audio control system as set forth in claim 1 which includes a plurality of feedback means each of which is responsive to an output signal from one of said control means for adjusting the reference signals supplied to said control means to reduce the threshold level of any control means that is enabling a corresponding switching means.

7. An audio control system as set forth in claim 1 which includes a plurality of delay means each of which is responsive to a termination of the output signal from one of said control means for enabling the corresponding switching means for a predetermined time interval after the corresponding microphone output signal drops below said threshold level, thereby keeping said microphone turned on during normal pauses in the audio input to the microphone.

8. An audio control system as set forth in claim 1 which includes amplifying means connected to said microphones for amplifying the signals from the microphones that are turned on with a substantially constant gain.

9. A control system for an audio amplifying system having a plurality of microphones producing individual output signals, said control system comprising the combination of (a) a plurality of switching means each of which is connected between one of said microphones for turning the respective microphones on and off, (b) a plurality of control means each of which is connected to one of said microphones and is responsive to the individual output signal from one of said microphones for enabling the corresponding switching means to turn that microphone on in response to a microphone output signal above a predetermined threshold level, said control means permitting a plurality of said switching means to enabled at the same time so that a plurality of said microphones can be turned on at the same time, (c) a plurality of delay means each of which is connected to one of said control means and is responsive to termination of the output signal from one of said control means for enabling the corresponding switching means, without disabling any of the other switching means, for a predetermined time interval after the corresponding microphone output signal drops below said threshold level, thereby keeping said microphone turned on during normal pauses in the audio input to the microphone.

10. An audio control system as set forth in claim 9 wherein said delay means comprises an RC circuit between said control means and the corresponding switching means for generating a signal to enable said switching means for a predetermined time interval after the control means ceases to supply such an enabling signal.

11. An audio control system as set forth in claim 9 which includes means for adjusting the discharge time of the capacitor in said RC circuit to adjust said time interval during which said switching means is enabled by said RC circuit following termination of the output signal from said control means.

12. A control system for an audio amplifying system having a plurality of microphones producing individual output signals, said control system comprising the combination of (a) a plurality of switching means each of which is connected to one of said microphones for turning the respective microphones on and off, (b) a plurality of control means each of which is connected to one of said microphones and is responsive to the individual output signal from one of said microphones for enabling the corresponding switching means to turn that microphone on in response to a microphone output signal above a predetermined threshold level, (c) and disabling means responsive to simultaneous initiation of output signals from at least two of said control means for disabling all said switching means in the system to prevent the transmission of the audio signal that caused said simultaneous initiation of output signals.

13. An audio control system as set forth in claim 12 wherein said disabling means includes a controlled gate between said control means and said switching means, and means for disabling said gate in response to simultaneous initiation of output signals from at least two of said control means.

14. An audio control system as set forth in claim 12 wherein said disabling means disables all of said switching means for only a predetermined time interval to permit dissipation of the audio signal that caused said simultaneous initiation of signals.

15. A control system for an audio amplifying system having a plurality of microphones producing individual output signals, said control system comprising the combination of (a) a plurality of switching means each of which is connected to one of said microphones for turning the respective microphones on and off, (b) a plurality of control means each of which is connected to one of said microphones and is responsive to the individual output signal from one of said microphones for enabling the corresponding switching means to turn that microphone on in response to a microphone output signal above a predetermined threshold level, (c) and reset means responsive to simultaneous initiation of output signals from at least two of said control means for disabling all said switching means in the system for a predetermined reset interval to prevent the transmission of the audio signal that caused said simultaneous initiation of output signals and to permit said audio signal to dissipate.

16. An audio control system as set forth in claim 15 wherein said reset means includes a controlled gate between said control means and said switching means, and means for disabling said gate in response to simultaneous initiation of output signals from at least two of said control means.

17. An audio control system as set forth in claim 15 which includes a plurality of delay means each of which is responsive to termination of the output signal from one of said control means for enabling the corresponding switching means for a predetermined time interval after the corresponding microphone output signal drops below said threshold level, thereby keeping said microphone turned on during normal pauses in the audio input to the microphone, and wherein said reset means resets said delay means in response to said simultaneous initiation of output signals from at least two of said control means to prevent said delay means from enabling said switching means in the absence of a desirable audio signal at the end of the reset interval.

18. An audio control system as set forth in claim 15 wherein said disabling means also resets the entire system.

19. An audio control system as set forth in claim 15 wherein said limiting means includes means for enabling the switching means associated with said *n* control means only when said *n* control means produce enabling output signals that are spaced apart by predetermined time intervals.

20. A control system for audio amplifying system having a plurality of microphones producing individual output signals, said control system comprising the combination of (a) a plurality of switching means each of which is connected to one of said microphones for turning the respective microphones on and off.

(b) reset means responsive to the number of microphones turned on for producing a reset signal to disable all said switching means when two or more microphones are turned on simultaneously, (c) limit means responsive to the number of microphones turned on for producing an inhibit signal to disable all remaining microphones when the number of microphones turned on reaches a preselected limit represented by a reference signal supplied to said limit means, said inhibit signal produced by said limit means being delayed by a predetermined time interval to permit said reset means to respond to the simultaneous turning on of two or more microphones before the remaining microphones are disabled when said preselected limit is reached, and (d) detecting means responsive to the turning on of each microphone for increasing the reference signal to said limit means to permit an additional microphone to be turned on, until the number of on microphones has reached the preselected limit.

21. A control system for an audio amplifying system having a plurality of microphones producing individual output signals, said control system comprising the combination of (a) a plurality of switching means each of which is connected to one of said microphones for turning the respective microphones on and off, (b) a plurality of control means each of which is connected to one of said microphones and is responsive to the individual output signal from one of said microphones for enabling the corresponding switching means to turn that microphone on in response to a microphone output signal above a predetermined threshold level, (c) a plurality of manually operated switch means each of which is connected to one of said switching means for enabling and disabling the respective switching means to turn the corresponding microphones on and off, and a plurality of disabling means each of which is connected to one of said control means for rendering the respective control means operative and inoperative, said manually operated switch means also being connected to said disabling means for rendering inoperative the corresponding control means whenever the corresponding switching means is enabled by said manually operated switch means.

22. A control system for an audio amplifying system having a plurality of microphones producing individual output signals, said control system comprising the combination of (a) a plurality of switching means each of which is connected to one of said microphones for turning the respective microphones on and off, (b) a plurality of control means each of which is responsive to the individual output signal from one of said microphones for enabling the corresponding switching means to turn that microphone on in response to a microphone output signal above a predetermined threshold level, (c) and limiting means responsive to nonsimultaneous enabling output signals from *n* (wherein *n* is any whole integer) of said control means for disabling all the other switching means in said system so that the number of microphones that can be turned on at any given time is limited to a maximum of *n*.

* * * * *